Jan. 26, 1937. J. H. L. DE BATS 2,068,848
METHOD OF FORMING DIAMONDIFEROUS ABRASIVE COMPOSITIONS
Filed Feb. 23, 1934 3 Sheets-Sheet 1
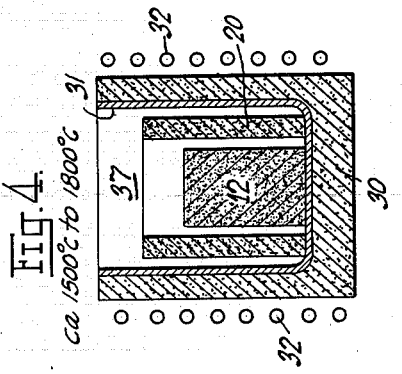
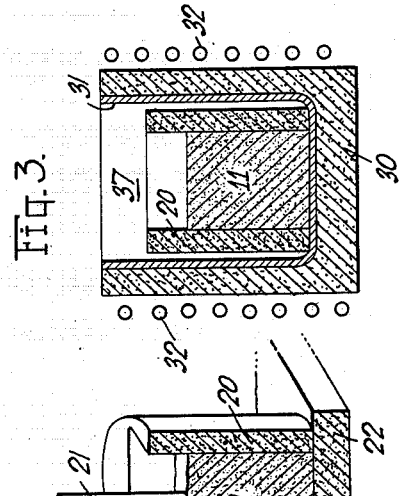
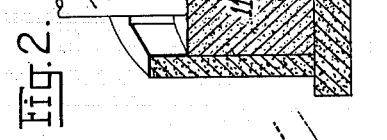
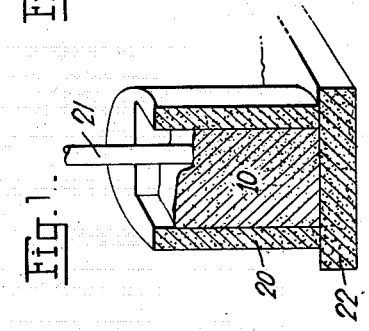
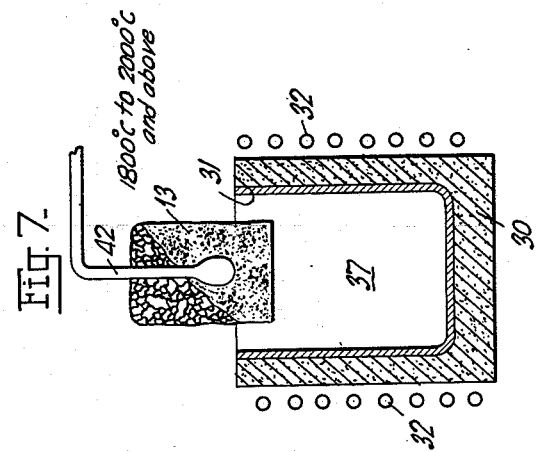
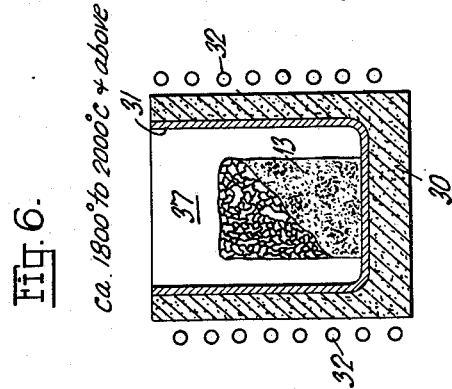
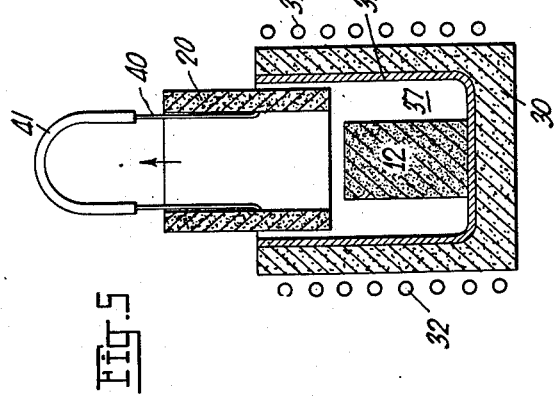
INVENTOR
JEAN HUBERT LOUIS DE BATS.
BY
Austin + Dix
ATTORNEYS Jan. 26, 1937. J. H. L. DE BATS 2,068,848
METHOD OF FORMING DIAMONDIFEROUS ABRASIVE COMPOSITIONS
Filed Feb. 23, 1934 3 Sheets-Sheet 2
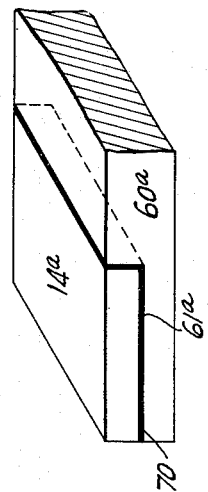
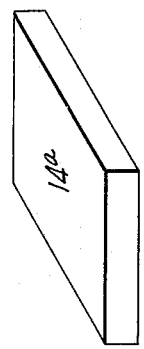
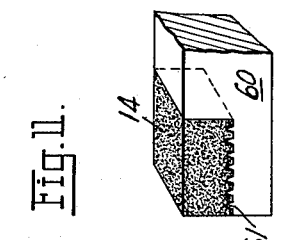
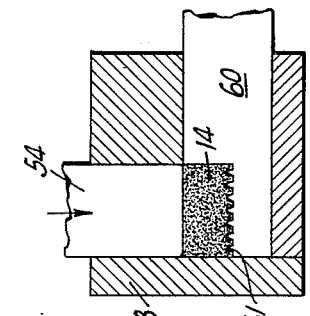
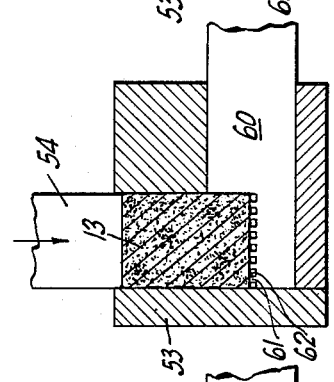
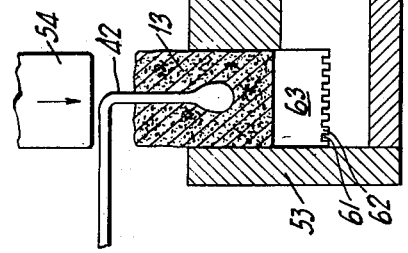
INVENTOR
JEAN HUBERT LOUIS DE BATS.
BY
ATTORNEYS Jan. 26, 1937. J. H. L. DE BATS 2,068,848
METHOD OF FORMING DIAMONDIFEROUS ABRASIVE COMPOSITIONS
Filed Feb. 23, 1934 3 Sheets-Sheet 3

INVENTOR
JEAN HUBERT LOUIS DE BATS
BY
ATTORNEYS

Patented Jan. 26, 1937

2,068,848

UNITED STATES PATENT OFFICE 2,068,848

METHOD OF FORMING DIAMONDIFEROUS ABRASIVE COMPOSITIONS

Jean Hubert Louis De Bats, East Orange, N. J., assignor of ten per cent to Howard W. Dix, Scarsdale, N. Y., and ninety per cent to Metal Carbides Corporation, Youngstown, Ohio, a corporation of New Jersey Application February 23, 1934, Serial No. 712,473

2 Claims. (Cl. 75—137)

This invention relates to improved drop-forged refractory metallic compositions and articles and methods of producing the same.

Hitherto in the elaboration of refractory metallic compositions such as tungsten carbide and the like into tool tips, wearing parts, etc., it has been proposed to incorporate therewith softer metals, such as cobalt, which were intended to serve as binding materials. Such composites were prepared by milling the ingredients, in powdered form, and in suitable proportion, and thereafter compressing them to a rough form under great pressure. Subsequent heat treaments or so-called "sintering" steps were then applied for the purpose of sintering the particles of the mass into a composite whole.

Sintered products, generally, have been found, in practice, to be highly frangible and generally unable to withstand shocks and vibrations encountered in heavy machine work and like usages. In fact, when used on certain heavy machining jobs, tools tipped with nibs of sintered refractory materials have been found to explode, which may be attributed, more or less, to the enormous stresses built up in the material in the forming operations.

It has now been found that refractory-base materials generally, such as tungsten carbide, molybdenum carbide, titanium carbide, tantalum carbide, and the like, and other refractory compositions, may be treated in such a manner as to avoid the building-up or formation of any undesirable or undue stresses in the material. Such new treatments have been found to permit the production of improved refractory tipped or surfaced tools and wearing parts which are extremely resistant to fatigue, vibration, shock and disruptive conditions met with in machine practice and heavy machine practice generally, and such new products have met with signal success in practice.

A particular feature of novelty of the present invention, therefore, resides in the formation of cutting metal compositions of refractory materials such as tungsten carbide associated with one or more of the following softer metals such as cobalt, nickel, iron, and the like, in which the basic materials are thoroughly comminuted and intimately mixed, thereafter tamped into crucibles and heated to complete reaction in an induction furnace. The so reacted and heated mass, before being subjected to a forging blow is characterized by a highly spongy fracture when broken upon cooling, and in the process of making an improved cutting tool or wearing part and while yet at furnace heat, it is then removed from the furnace and subjected to a drop-forging or percussion hammering operation. Owing to the inherent hardness of the material, when cooled, a single drop-forge or hammer blow, usually of the order of 5 to 250 tons per sq. in., depending upon the size of the mass forged, is sufficient to secure a desired shaped slug or nib. The crystalline structure imparted to the so-formed slug or nib differs from that of a sintered product of the same empirical composition, and this difference in molecular condition is further borne out by the performance of these materials under actual shop conditions.

A further feature of novelty of this invention resides in the direct drop-forging of improved cutting and wearing surfaces upon tools and wearing members, wherein the highly-heated, spongy, reacted mass is directly drop-forged onto a tool shank or body or onto other articles, while at the same time having imparted thereto a desired finish form which requires but a finish grinding or lapping to perfect the same.

Still another highly advantageous and yet quite unexpected feature of novelty of the present invention resides in the fact that nibs, slugs, plates or rods of refractory carbide-base materials, and the like, may be substantially finish formed in a single drop-forging operation from spongy, plastic masses and thereafter brazed or welded to a tool shank or body, without affecting the physical condition of the material, or destroying its capacity to work under the most disadvantageous, operative conditions.

Another feature of novelty of the present invention is an improved method of forming drop-forged diamondiferous refractory metal masses and the products so produced.

The several features of novelty and advantage recited above, are set forth by way of description, only, as it has not as yet been found possible to accurately define and determine the underlying laws governing the improved performance or formation of these materials, save insofar, that, as at present advised, only the drop-forging operation or step in the process of treatment appears to give the desired results. This conclusion appears to be justified, for, when a sintered article is treated according to the process of the present invention, that is, by heating the sintered article or mass until it attains a spongy, semiplastic condition in the furnace and thereafter drop-forging the same, the resultant product appears to be substantially identical, as far as can be determined, with any other product of the same empirical composition which has been treated throughout according to the process herein disclosed.

The drop-forging of the spongified and plastified heated mass in cold dies appears to exert a critical effect upon the mass in its densified condition resulting from the combination of the sudden cooling caused by the close contact of the cooling walls of the die and the blow of the forging die. The combination of these effects, namely, the sudden cooling in contact with metal walls whereby the heat of the mass is rapidly withdrawn and the enormous densification caused thereby, as well as by the simultaneous application of the forging blow, gives rise to a metal mass which has a variety of peculiar properties.

The densified and quickly cooled mass resulting from the treatment just described, is characterized not only by high, inherent hardness, but also by extreme toughness. The result of this combination of properties or characteristics is that tools and wearing articles tipped or surfaced with the improved drop-forged refractory material of the present invention will cut at higher speeds, while at the same time this improved material is characterized by an ability to withstand shock and vibration under the most trying conditions obtaining in machine-shop practice.

For example, it has been found that machine tools having cutting faces or nibs of refractory carbides treated according to the present invention and drop-forged in place on the tools, have been used with great success on difficult jobs such as machining chromium, nickel, molybdenum steel forgings, and the like, and in machining naval gun castings and shells, as well as in heavy forming-and-cutting work where so-called "hogging" cuts are desirable. All of this, as opposed to the light finish trimming which is the limit of performance of sintered tool members which have been found to explode in use when heavier duty was imposed on them. These failures in the sintered practice, as noted above, appear to be due to the terrific stresses built up in the masses thereof during the forming operations. This apparent freedom from internal stress of the improved materials of the present invention, is exemplified in the high-work capacity of the tools made therefrom under the most adverse conditions, including whip and vibrations in lathes and milling machines.

The improved drop-forging process of the present invention permits the manufacture of refractory metal compositions either as wearing parts, or as cutting nibs, and the like, at extremely low cost, because of the fact that the equipment used is standard and adapted for a number of purposes, and no great or special skill is required of the operators.

Not only may the improved cutting facings be drop-forged in place upon tool bodies, but due to the ease and rapidity of the operations of the improved process herein, the tool bodies may themselves be made of high-grade tool steel, and the like, and may be in a hardened condition, and will not be affected by the forming or drop-forging operation involved in the tipping operation, as herein described. Such new and improved tools having hardened steel bodies or shanks are found to give increased performance due to lack of vibration in the tool post, and the like. In normal operation of machine tools where they are held in tool posts by hardened steel screws, the relatively softer metal of the body or shank of the tool is soon eaten into by the hardened set screws, with the result that minute rocking or vibration about the set screws as a fulcrum or point, sets in. Such rocking or vibration is extremely minute upon the edge, but is none the less effective in causing the cutting in or wearing away of the shank on its point of support, so that in a short time the entire tool has lost its balance. Attempts to remedy this condition by periodically tightening up on the set screws of the tool post only speed up the destruction of the tool due to the biting of the set screws into the relatively softer metal of the shank. When the vibrations in the tool, because of these conditions, reach a certain point, the tool usually gets dull on the edge, requiring more power to abrade the chip as opposed to the desired operation with a sharp-edged tool which gives a true cut.

It will be readily appreciated, and it has been found as the result of practice with tools made according to the principles of the present invention, that with a sharp-edged tool the work, preferably mounted in an efficient high speed steel tool holder, can be cut at a faster rate, while at the same time the heats generated are of an appreciably lower order than those which are generated by the use of dull-edged tools. With dull-edged tools the metal removed is literally torn off of the body or article which is being surfaced, and the tool, itself, is gouged and crated at the cutting tip as a result of the combination of the high heat developed and the scouring action of the chip upon the tip at the rear of the cutting edge thereof.

The improvements of the present invention, including the drop-forging of refractory tungsten carbide and tungsten carbide-base metals, and the like, have been found to give excellent results with compositions including tungsten carbide to those varying in tungsten carbide content from 50-98%, with the balance cobalt, nickel, iron or like softer metals. For hard wearing and cutting compositions a range of 80-95% tungsten carbide, with balance of cobalt, nickel, iron, or the like, is preferable. Particularly advantageous results have been obtained by using and drop-forging a composition containing substantially 92% tungsten carbide, with the balance cobalt. Other compositions which have been found to give excellent results include 80% tungsten carbide with 20% cobalt; 75% tungsten carbide with 25% cobalt, and compositions varying therebetween. In the compositions herein recited it has been found that nickel may replace cobalt with certain advantages.

While the compositions hereinabove recited, when subjected to the drop-forging treatment of the present invention, have been found to give excellent results in operation, further desirable results, including freedom from cratering, even under the most adverse conditions, have been found to result when compositions having the following empirical formula, have been used:

| | |
|---|---|
| Tungsten | 80 |
| Carbon | 5 |
| Titanium carbide | 3 to 10 |
| Cobalt, nickel, or iron | Up to 12 |

The inclusion of at least 3% of titanium carbide in the compositions disclosed herein, improves them to a marked extent. This improvement may be due, in part, to the protecting action of the added material, as it has been noted that there is an apparent freedom from deposition or formation of free carbon in the form of graphite in the forming operations of the present invention, including the forging and cooling resulting from the drop-forging operation.

Where cutting tools and grinding members for core-drilling, grinding and forming members for polishing granite, marble, slate and other like mineral materials are to be used, desirable results may be secured by incorporating in a tungsten carbide mass a suitable proportion of diamond particles, either in chip or powdered form. Where cutting operations are to be carried out the diamonds are preferably incorporated in the carbide mass in chip form, while if polishing operations are to be carried out the diamonds may desirably be present in powdered form.

The diamond material, in particulate form, either chips or powdered, may be incorporated in the powdered tungsten carbide mass or tungsten carbide-base alloyed mass and subjected to the usual furnacing and drop-forging steps. The resultant drop-forged diamondiferous refractory-base mass or metal is characterized by a remarkable toughness accompanied by distinct abrading qualities permitting its use for core-cutting and other purposes such as slide saws for marble, slate and other stones and mineral materials. The improved performance of such a diamondiferous refractory-base alloy is considered to be due in part to the inherent refractory quality of the embedding or matrix material, such as tungsten carbide, which itself is characterized by a high mineralogical hardness. This is true, even though admixtures of alloying metals such as cobalt, nickel, iron, and other equivalents up to 50% of the mixture may be included in the carbide-base mass.

In forming such a diamondiferous or diamond-containing mass, it has been found that the best results are secured by intimately mixing a powdered starting mass in elemental form, such as tungsten, carbon (lamp black, sugar carbon and the like), with or without any of cobalt, nickel, or iron, plus the requisite amount of diamond particles, whether chips or dust, and subjecting this mixture to the steps of the process herein, including the spongified and plastified heating step followed by a drop-forging of the so-spongified and plastified mass.

Due to the presence of the free carbon, and the absence of oxidizing conditions, the diamonds may undergo a light surface reaction, and without affecting the mass thereof. Due further to the fact that the embedding mass is itself heated to the same temperature and subjected to the same pressure conditions, the diamond particles are not subjected to stresses or internal strains, so that the final product is free from internal stresses and strains.

While tungsten carbide, alone, is preferred as the embedding mass for diamond-containing refractory compositions, other refractory compositions having tungsten carbide, or its equivalent, present in major proportions, may be used as embedding materials. Among such compositions contemplated are those in which the tungsten carbide may be replaced in part by titanium carbide up to 10% of the embedding mass and in which auxiliary metals such as cobalt, nickel or iron may be present in amounts from a fraction of a percent up to 50% of the embedding mass.

While the present invention has been described generally with particular reference to the elaboration of powdered materials into a drop-forged mass, which elaboration includes the intermediate method step of bringing the material to a spongified and plastified condition previous to drop-forging the same, desirable results of the present invention can also be secured by heating slugs or billets which have been previously centrifugally cast so that they attain the spongy, semi-plastified condition described herein and while in this condition and at white heat, are subjected to the drop-forging step.

From the foregoing it will be appreciated that by the novel drop-forging treatment of the present invention, refractory materials such as tungsten carbide-base compositions can now be formed into a variety of forms directly upon tools and that these tools may be characterized by great longevity under the most difficult operating conditions. It will be further understood that not only may tools and wearing parts be tipped or surfaced with a drop-forged, refractory cutting composition, but that cutting tips and wearing parts of surfaces, as such, may be directly drop-forged onto suitable tool bodies.

To more clearly understand and explain the foregoing general description of the improvements of the present invention, reference is made to the accompanying drawings, in which the various forming steps and products of the present invention are illustrated. These illustrations are given by way of example, only, and it is not intended to be restricted to the specific tools shown, except as any such limitations are imposed by the appended claims.

In the drawings like numerals refer to similar parts throughout the several views, of which—

Fig. 1 is a vertical section, partly in elevation, of a crucible in which a loose powdered mix is being tamped;

Fig. 2 is a view similar to Fig. 1, showing the tamped material;

Fig. 3 is a vertical cross-section through an induction furnace and contained crucible with its tamped material;

Fig. 4 is a view similar to Fig. 3, showing the shrinkage of the material after the application of an initially predetermined heat;

Fig. 5 is a view similar to Fig. 4, showing the removal of the crucible;

Fig. 6 is a view similar to Figs. 3–5, showing the heated material, partly in elevation and partly in a vertical section and indicating the spongy condition of the heated mass after application of high heat;

Fig. 7 shows a method of removing the heated and spongified mass from the induction furnace;

Fig. 8 shows the insertion of the white-hot spongified reacted mass in a drop-forging die, which includes a shank of a tool upon which a tool is to be drop-forged;

Fig. 9 shows the starting of the drop-forging blow;

Fig. 10 shows the completion of the drop-forging blow with the original spongified mass now compacted and chilled after being drop-forged on the tool shank and autogeneously fused thereto.

Fig. 11 is an end elevation of a tool shank showing a shoulder and a drop-forged refractory carbide mass thereon and fused to the said shoulder;

Fig. 12 is an elevation of a drop-forged refractory metal slug or nib;

Fig. 13 shows a method of applying the nibs of Fig. 12 to tool shanks by brazing or welding;

Figure 15:
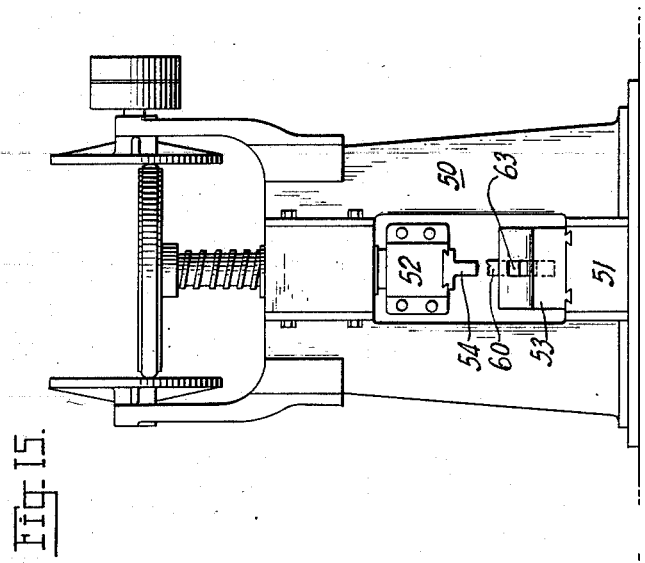
Fig. 15 is an elevation of a drop-forge or percussion forge.

Considering the drawings somewhat in detail, the improved process and product may be considered with respect to the detailed steps of the process and the conditions of operation or carrying out of the same.

In Fig. 1 there is shown the initial step in the prepartion of the improved drop-forged refractory alloy compositions of the present invention. A powdered mixture, 10, of tungsten carbide alone or tungsten carbide and nickel or cobalt or iron in desired proportions and containing diamond particles either in chip or powdered form and up to one-third of the total mass of the mix is tamped in a graphite mold 20 by means of a rod or pencil 21. A table or base-plate 22 may be used to support the graphite crucible and its contents 10. The powdered mass is lightly compressed or compacted by the tamping operation, the now tamped mass 11 being of sufficient density to adhere to the walls of the graphite crucible 20, as indicated in Fig. 2. As noted, the graphite crucible may be of any desired configuration and is usually provided without a bottom.

Figure 14:
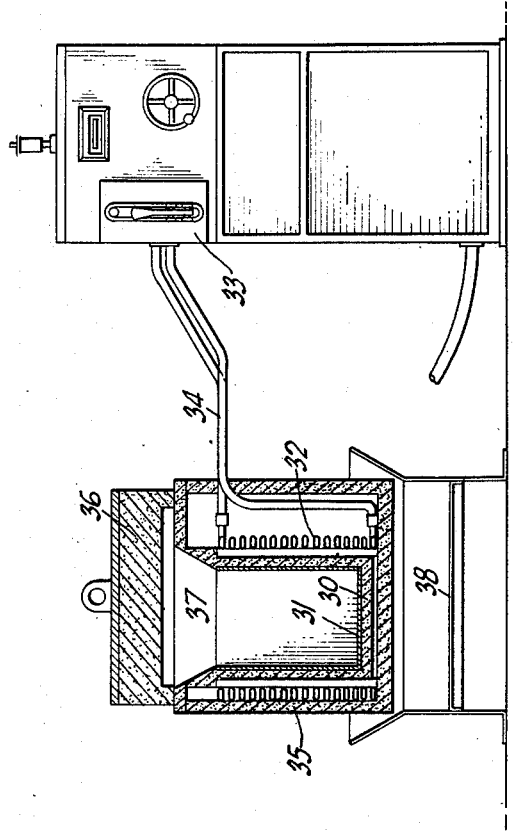
Fig. 14 is a partly schematic showing of the induction furnace and its control equipment, the furnace being shown in vertical section.

The crucible 20 with its contained, tamped carbide metal alloy mass is inserted in a suitable furnace such as an induction furnace 30 having a refractory liner 31 and a coil 32 disposed therearound and connected to a high-frequency apparatus, designated generally by the numeral 33, by suitable leads 34, as shown more particularly in Fig. 14. The furnace and coil may be fitted in or sheathed in an insulated casing or housing designated generally by the numeral 35. A removable cover 36 can be used. The furnace is hollow inside, forming a chamber designated generally by the numeral 37. The furnace assembly 30, may be mounted on a suitable standard or support, designated generally by the numeral 38. The induction furnace and associated equipment is shown generally and is of the type known as the Ajax high-frequency furnace. This showing is made for the purpose of outlining the features of operation of the present process and no claim of novelty to the furnace parts, as such, is made herein.

The tamped mass 11 with its container 20, is inserted in the furnace chamber 37, which has preferably been previously brought to a desired initial heat of the order of 1500 to 1800° C. At these temperatures the tamped, powdered mass of tungsten carbide and associated metals, such as nickel, cobalt or iron, and in amounts varying from 50 to 98% of the crucible material, with the balance any of the associated metals noted, is subjected to an increasing heat until the body of the material 11 shrinks appreciably, as indicated in Fig. 4, causing the body of the apparently now reacted mass 12, to shrink away from the walls of the crucible 20. When this condition is attained the crucible 20 is removed out of the furnace and away from the carbide-metal mass 12. In removing the crucible from the furnace a spring-tongs 40, having an insulated rubber handle portion 41, is inserted inside of the crucible and the latter removed from the furnace.

The heat of the furnace is then increased to temperatures of the order of 1800 to 2000° C., and above, depending upon the carbide or refractory metal content of the mass, until the shrunken mass 12 starts to swell up and assume a generally spongified, porous condition, which mass is indicated generally at 13 in Fig. 6. When in this spongified, plastified condition the mass 13 of carbide metal is now ready for further treatment by the drop-forging steps of the process. The attainment of the condition shown in Fig. 7 is generally decided by pressing or forcing a carbon pencil into the mass. It is to be noted that when a carbon pencil or the like can be forced into the mass 13, the latter has attained the right spongified and plastified consistency.

Even under these conditions is it to be noted further that the mass 13 is still solid and can be handled with tongs, as indicated in Fig. 7, when the spongified mass 13 is then introduced into a drop-forge or percussion forge, shown in Fig. 15, and indicated generally by the numeral 50, having an anvil 51 and a hammer-head 52. On the anvil 51 is secured a die member 53 adapted to receive the shank of a tool 60. A hammer or male die member 54, configured to the mold member 53, is secured to the hammer-head or piston 52 in any suitable manner. The tool 60 may be provided with a shoulder 61 which, in turn, may have ridges 62, for a purpose to be described more in detail hereinafter. It is to be noted that the die member 53 is so configured and arranged as to form a tight mold 63 with the shank of the tool 60. The shank of the tool 60, is preferably made of hardened tool-steel, thereby giving an article which is highly resistant to vibration and shock stresses. Into the thus-formed mold cavity 63, the spongified and plastified white-hot carbide metal mass 13 is quickly inserted by means of the tungsten-tipped tongs 42. The plunger or hammer-head 54 is immediately permitted to strike the mass 13 with a percussion or drop-forging blow, of the order of 5 to 250 tons per square inch, and reduce the same to substantially one-half its original mass, or less, as indicated generally at 14 in Fig. 10. By the conjoint action of the high heat and the enormous pressure of the blow imparted by the member 54, together with the simultaneous sudden cooling, chilling or quenching of the drop-forged, heated mass 14 by the relatively cold walls 53 of the mold or die members, the said mass 14 is fused to and alloyed with the ridges 62 of the ridged shoulder 61 of the tool 50 forming an autogenous bond therewith.

While the ridges 62 are provided to permit a rapid, efficient and firm bond between the shoulder of the tool 60 and the nib 14, desirable results have been secured with plain, unridged shoulders.

This improved drop-forged nib 14, as formed in place on the tool in the manner indicated, is characterized by a desirable high hardness, together with enormous cutting efficiencies at high speeds on the toughest alloy steels and alloys generally.

Referring now to Fig. 12 there is shown a nib or slug 14a prepared in the manner above indicated for the slugs or nibs 14, but in which case the nib or member 14a is drop-forged as a separate member and is not secured to a tool or article. To prevent welding of the material of the nib or slug 14a to the walls or cheeks of the die during the drop-forging or percussion operation, the walls of the die may be preliminarily coated with oil, lime or other suitable material.

The nibs or slugs 14a may be made in any desired shape and configuration and of any desired density according to the impact of the drop-forging blow, which may vary from 5 to 250 tons per square inch. Such nibs may be secured onto tool shanks 60a, as shown more particularly in Fig. 13, by suitable bonding or brazing material 70. The brazing material may be in powdered or sheet form and laid on the shoulder 61a of the tool shank and secured thereto by the usual brazing metals. Where desired, the preformed nib 14a may be autogenously welded to a tool shank.

By providing preformed nibs of drop-forged refractory metal compositions of varying contents, a wide operative field is opened in the machine-tool art, as the tool user is enabled to buy these improved drop-forged, highly refractory metal nibs or slugs and secure them on his own tools at a minimum of cost. Due to the remarkable performance of such nibs at high speeds excellent results and savings can be secured. The forged grain structure of the carbide material of the nibs 14 and 14a, and the natural hardness of the refractory components thereof, whether modified to a slight degree or not by any associated bonding material such as cobalt, nickel or iron, gives rise to tool nibs or members which have a remarkable toughness, as well as hardness under operating conditions so that even "hogging" cuts can be undertaken with the most difficultly machinable materials.

The improved drop-forged members, whether cutting nibs, wearing parts, or the like, as such, or secured to tool bodies, either integrally or through suitable bonding or brazing means, permit, for the first time, the universal and general use of refractory materials such as tungsten carbide, molybdenum carbide, vanadium carbide, titanium carbide, tantalum carbide, and other like refractory carbides, as well as the refractory borides and silicides of the metals of the sixth periodic group, in machine tools and wearing parts which are subjected to enormous stresses and which require both high hardness and inherent toughness.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. The method of forming diamondiferous abrasive compositions comprising intimately admixing tungsten powder and carbon powder in amounts sufficient to form tungsten carbide, incorporating in the powdered mix up to one-third of the mass of the same of particulate diamonds, tamping the said diamondiferous mass in a carbonaceous crucible, heating the so-treated material to a temperature sufficient to cause coalescence and shrinkage of the mass, removing the crucible from the shrunken mass, heating the said mass to a temperature sufficient to cause the same to swell and assume a spongified, plastified condition while retaining its external solid aspect, and removing the so-heated and spongified diamondiferous refractory mass to a drop-forge and drop-forging the same at white heat with blows of the order of 5 to 250 tons and above.

2. The method of forming diamondiferous abrasive compositions comprising intimately admixing tungsten powder and carbon powder with one or more of the group comprising cobalt, nickel and iron in amounts sufficient to form tungsten carbide, incorporating in the powdered mix up to one-third of the mass of the same of particulate diamonds; tamping the said diamondiferous mass in a carbonaceous crucible, heating the so-treated material at a temperature sufficient to cause coalescence and shrinkage of the mass, removing the crucible from the shrunken mass; heating the said mass to a temperature sufficient to cause the same to swell and assume a spongified, plastified condition while retaining its external solid aspect; and removing the so-heated and spongified diamondiferous refractory mass to a drop-forge and drop-forging the same at white heat with blows of the order of 5 to 250 tons and above.

JEAN HUBERT LOUIS DE BATS.